Dec. 21, 1965     H. D. BOWMAN     3,224,171

EXHAUST FILTER FOR INTERNAL COMBUSTION ENGINES

Filed Aug. 16, 1963

*INVENTOR.*
Hyman D. Bowman

United States Patent Office 3,224,171
Patented Dec. 21, 1965

3,224,171
EXHAUST FILTER FOR INTERNAL COMBUSTION ENGINES
Hyman D. Bowman, 801 W. Morgan St., Raleigh, N.C.
Filed Aug. 16, 1963, Ser. No. 302,586
2 Claims. (Cl. 55—274)

This invention relates generally to filtering devices and more particularly to filtering devices used in conjunction with the exhaust systems of internal combustion engines to reduce the amount of smoke, smog and other types of undesirable gases from being exhausted into the atmosphere.

In the past various types of devices have been developed to treat the exhaust fumes of automobiles so that dangerous or undesirable fumes will not be allowed to enter the atmosphere. None of these devices, however, have been found completely satisfactory. It has been found that to have a filter media which will do an adequate amount of filtering the compaction and composition must be of a fairly compact nature. When this condition exists, pressure within the exhaust system of the internal combustion engine is not strong enough to force the exhaust gases through such filter without the build-up of undesirable back pressures. For this reason, other types of internal combustion engine filters have not obtained the results which applicant obtains by using a fine texture filter media in combination with an air-current motivation means which completely eliminates the undesirable back pressures in the engine and even increases the efficiency thereof.

Also, up to now it has not been possible to determine when a filter used for eliminating undesirable gases from being exhausted into the atmosphere was saturated with impurities to the point that it was no longer capable of accomplishing the result desired. Applicant has devised a simple yet efficient means for indicating when the filtering means is saturated and therefore should be changed.

It is therefore an object of the present invention to provide an improved filter device for internal combustion engines having at least two inlet ports, a set of vertically disposed baffle plates, a horizontally disposed cylindrical filter media, flapper valves, electrical indicating means connected to said flapper valves and current impelling means for boosting the flow of gases through the device.

Another object of the present invention is to provide a filter device to be used in conjunction with internal combustion engines having a series of baffles with non-aligned openings therein in co-operative relation to a hollow, cylindrical filter media so that the explosions within the engine will be muffled as well as the gases from such engine being treated prior to their exhaust into the atmosphere.

Another object of the present invention is to provide a filter device for internal combustion engines which has a booster current-flow means used in conjunction with a hollow cylindrical filter media to assure that undesired back pressures will not build up due to such filter being in the exhaust system.

A further object of the present invention is to provide an internal combustion engine filtering device having indicating means which will become activated upon the saturation of the filter media thereby notifying the operator of the engine that the filter is no longer accomplishing its intended purpose and therefore needs to be replaced immediately.

Other objects and advantages of the present invention will become apparent and obvious from a study of the following description and the accompanying drawings which are merely illustrative of the present invention.

Figure 1:
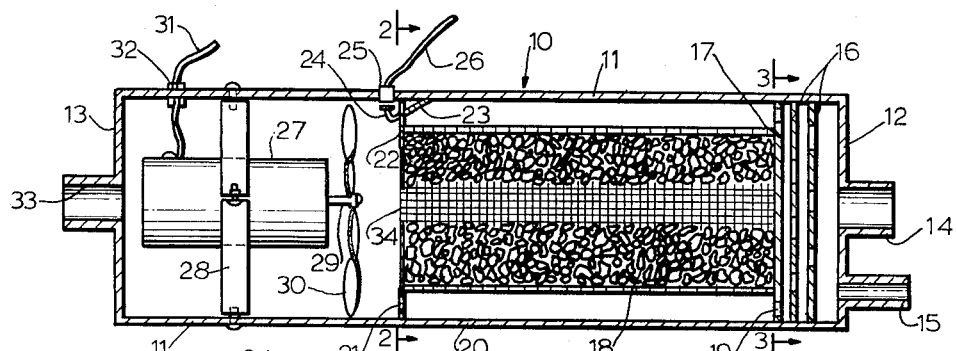
FIG. 1 is a longitudinal, sectional view of the present invention.
Figure 2:
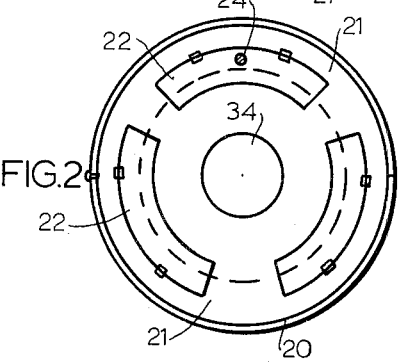
FIG. 2 is a sectional view taken from lines 2—2 of FIG. 1.
Figure 3:
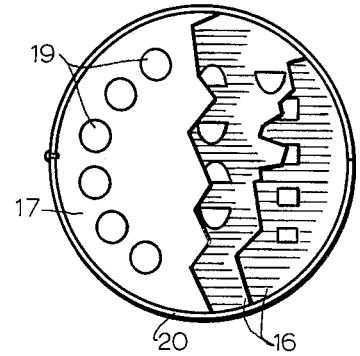
FIG. 3 is a sectional view taken from lines 3—3 of FIG. 1.
Figure 4:
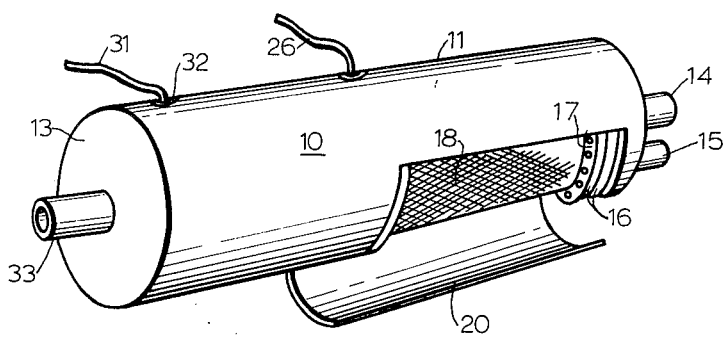
FIG. 4 is a perspective of the device of the present invention showing the access door to the filter media in a partially opened position.

With further reference to the drawings, FIG. 1 discloses a longitudinal cross-section of the present invention comprising a filter unit 10 having cylindrical wall portions 11 forming a housing with a forward end portion 12 and a rear end portion 13. The forward end portion has two openings or ports 14 and 15 which are adapted to co-operate with the manifold pipe (not shown) and the crankcase oil breather pipe (not shown) respectively of an internal combustion engine.

Mounted rearwardly of the forward end portion 12 and within the housing 11 are a series of baffles 16. Each baffle contains a multiplicity of irregular shaped openings in non-alignment with openings in the other baffles. This arrangement causes gases passing through the baffles to travel an irregular course thereby muffling the sound created by the engine.

Rearwardly of the baffles 16 and within the housing 11 is a filter flow plate 17 in co-operative relation with a hollow, cylindrical filter media 18. The filter flow plate 17 has a series of openings 19 about its peripheral portion so that fumes from the engine are directed to the outer edge of the filter media 18.

The hollow cylindrical filter media is of a smaller diameter than the housing 11 and is mounted in axial alignment therewith. An access door 20 is provided so that such filter media may be removed and replaced whenever desired. This door may be hinged by any conventional means and likewise may be secured in closed position by means well known to the art.

Rearwardly of the filter media 18 is a retainer plate 21 which along with the flow plate 17 define the longitudinal compartment within which said media is inserted. Any desirable means may be provided for removably securing said media in lateral and longitudinal position within said housing 11.

Flapper valves 22 are provided which are hingedly secured to retainer plate 21. A spring or other tensioning means 23 are provided on a forward side of the flapper valves 22 to hold such valves in a normally closed position. An electrical conduit means 24 is provided which is fixedly secured to one of the flapper valves 22. A second contact means 25 is insulatedly secured to housing 11 with an electrical conduit means or wire 26 connected thereto. This wire 26 is connected with a warning system (not shown) such as a light, horn, buzzer or other means which is mounted in such a manner to attract the attention of the operator of the engine.

Within the housing 11 and aft of the retainer plate 21 is a motor 27 centrally mounted within such housing and supported by bracket means 28. A rotatable shaft 29 projects from the motor 27 in axial alignment with the longitudinal axis of the housing 11. Mounted on such shaft 29 are fan blades 30 which are adapted to rotate in such a direction as to force the passage of air from forward to rear of the housing.

An electrically conductive wire 31 is provided which is operatively connected to the motor 27, passes through an insulating grommet 32 in the housing 11 and to any suitable source of electrical current such as a generator, battery or other means.

Centrally disposed within the rear end portion 13 is an outlet port 33 which may be connected to the tail pipe or similar structure of the exhaust system of the engine.

In operation of the device of the present invention the exhaust fumes from combustion within the engine passes through the manifold (not shown) and into the manifold inlet port 14. Also gases from the crankcase oil breather of the engine pass into the oil breather port 15 and into the interior of the housing 11. These gases then pass through the irregular openings in the baffles 16 which, due to the off-set of the openings in each baffle, tend to muffle the noises of the engine. Next the gases pass through the openings 19 of the flow plate 17 and about the exterior of the filter media 18.

Since the flapper valves 22 of the retainer plate 21 are in normally closed position the gases are forced to pass through the filter media 18 which is composed of activated charcoal or other suitable material. As the gases pass through this media they enter the hollow opening within the center of the filter and pass through the central opening 34 of the retainer plate 21. At this point the gases have been cleansed and undesirable fumes and particles have been removed therefrom.

To assist the gases in passing through the filter media and through the over all device and to prevent the build-up of undesirable back pressures which may impair the operation of the engine or even stall the same, a motor 27 is provided with a fan 30 mounted thereon for drawing such gases through such device. This fan is mounted in such a manner as to suck the air and gases through the filter media and then to blow the same out through exhaust port 33. An electric wire or conduit 31 is provided which gives the necessary electric energy to the motor 27 to operate the same. Since the overall unit is grounded there is not a need for a second wire to complete the electrical circuit through the motor.

When the device of the present invention is being used the filter media may eventually become saturated with impurities which it has filtered out of the exhaust fumes and therefore become imperforate to the passage of air and fumes therethrough. At this point such media will need to be changed in order to again obtain the desired filtering. To notify the operator of the engine that this condition exists, flapper valves 22 are provided with tensioning means 23 to hold such valves in normally closed position. When the filter media becomes clogged and saturated the pressure of air flowing through the device will overcome the tensioning means 23 thereby allowing the flapper valves 22 to open so as not to allow a dangerous back pressure to build up in the device. When such valves are opened the filtering benefits of the unit are no longer obtained. To notify the operator of the engine that such condition exists a contact means 24 is fixed to one of the flapper valves 22 and in alignment with a second contact means 25. These contacts are in open position when the flapper valves are closed but when the flapper valves are forced open the contact is closed thereby completing an electric circuit through wire 26, contacts 24 and 25 and through the grounding of the overall device. In this completed circuit is mounted a buzzer, horn, light or other indicating means so that the operator is notified of the fact that the filter is clogged and that the exhaust fumes are bypassing the filter through the flapper valves 22. When this condition arises all that is necessary is that the access door 20 be opened, the old filter removed, and a new filter inserted and the access door resecured. Upon the insertion of a new filter the exhaust fumes pass through such filter and therefore the flapper valves will remain closed due to tensioning means 23 and the contact which closes the warning circuit will remain open.

It will be obvious from the foregoing description that the device therein described has the advantages of being cheap to manufacture and simple in operation while indicating the condition of the unit and notifying the operator thereof when an undesirable condition exists. The device also tends to muffle the sound of the engine while at all times preventing back pressures from building up to a dangerous level.

The terms "forward," "rear," and so forth, have been used herein merely for convenience in the foregoing specification and in the appended claims to describe the filter device and its parts as oriented in the drawings. It is to be understood, however, that these terms are in no way limiting to the invention since the device may obviously be disposed in many different positions when it is used.

The present invention may be carried out in other specific ways than those herein set forth without departing from the spirit and essential characteristics of the invention. The present embodiments are, therefore, to be considered in all respects as illustrative and not restrictive, and all changes coming within the meaning and equivalency range of the appended claims are intended to be embraced therein.

What is claimed is:

1. A filter device for removing undesirable fumes and particles from the exhaust and other gases from an internal combustion engine comprising a generally cylindrical housing having front and rear end wall portions with openings in the front wall portion for the admission of gases from the exhaust and crank case of an internal combustion engine, a series of baffles mounted in spaced relation transversely of said generally cylindrical housing and having openings offset for indirect flow of gases therethrough, an additional baffle mounted transversely of said generally cylindrical housing and having circumferentially spaced openings near its outer edge through which gases can pass into the area adjacent the generally cylindrical wall of said housing, a hollow generally cylindrical filter media removably mounted concentrically in said generally cylindrical housing in a manner to provide a chamber within said housing around the exterior of said filter media, whereby gases can flow from the chamber around the filter media to the interior and through the rear thereof, a member closing the space around the exterior of the rear end of said filter media and including pressure seated valves which can open when subjected to pressure in said chamber in excess of a predetermined value, and means for indicating when said valves are in open position.

2. The structure of claim 1 and means operatively associated with said filter device tending to draw gas therethrough.

References Cited by the Examiner
UNITED STATES PATENTS

| | | | |
|---|---|---|---|
| 1,344,976 | 6/1920 | Blain et al. | 181—72 |
| 1,695,554 | 12/1928 | Markels | 55—310 |
| 1,811,762 | 6/1931 | Schnell. | |
| 2,057,904 | 10/1936 | Morse | 55—274 X |
| 2,557,557 | 6/1951 | Newcum | 55—517 X |
| 2,738,854 | 3/1956 | Thrower. | |
| 2,795,103 | 6/1957 | Jenison. | |
| 2,879,892 | 3/1959 | Frakes | 210—90 |
| 3,032,968 | 5/1962 | Novak et al. | |
| 3,080,058 | 3/1963 | Resaen | 210—90 |
| 3,129,078 | 4/1964 | Hobbs | 55—313 |

FOREIGN PATENTS 616,696  8/1934  Germany.

ROBERT F. BURNETT, *Primary Examiner.*

HARRY B. THORNTON, *Examiner.*

L. H. McCARTER, *Assistant Examiner.*